US012790025B2

(12) United States Patent
Blacha et al.

(10) Patent No.: US 12,790,025 B2
(45) Date of Patent: Nov. 10, 2026

(54) STRUCTURALLY BONDED ARRANGEMENT

(71) Applicant: AIRBUS HELICOPTERS DEUTSCHLAND GMBH, Donauwörth (DE)

(72) Inventors: Martin Blacha, Donauwörth (DE); Sebastian Buesing, Augsburg (DE); Thomas Joachim, Augsburg (DE)

(73) Assignee: AIRBUS HELICOPTERS DEUTSCHLAND GMBH (DE)

( * ) Notice: Subject to any disclaimer, the term of this patent is extended or adjusted under 35 U.S.C. 154(b) by 197 days.

(21) Appl. No.: 18/414,810

(22) Filed: Jan. 17, 2024

(65) Prior Publication Data

US 2024/0308689 A1 Sep. 19, 2024

(30) Foreign Application Priority Data

Mar. 16, 2023 (EP) .................................... 23162220

(51) Int. Cl.
*B64F 5/10* (2017.01)
*B64C 1/12* (2006.01)
*B64C 27/04* (2006.01)

(52) U.S. Cl.
CPC .................. *B64F 5/10* (2017.01); *B64C 1/12* (2013.01); *B64C 27/04* (2013.01)

(58) Field of Classification Search
CPC .............. B64C 1/12; B64C 27/04; B64F 5/10
See application file for complete search history.

(56) References Cited

U.S. PATENT DOCUMENTS

| | | | |
|---|---|---|---|
| 1,773,068 A | 8/1930 | Menneau | |
| 2,391,731 A | 12/1945 | Miller et al. | |
| 3,253,842 A | 5/1966 | Rabe | |
| 9,126,670 B2 | 9/2015 | Thable et al. | |
| 2008/0111024 A1 | 5/2008 | Lee et al. | |
| 2013/0084422 A1* | 4/2013 | Thable | B64C 1/12 428/137 |
| 2020/0369359 A1 | 11/2020 | Eilken et al. | |

FOREIGN PATENT DOCUMENTS

| | | |
|---|---|---|
| CN | 112606990 A | 4/2021 |
| CN | 115539472 A | 12/2022 |
| DE | 2441470 A1 | 3/1976 |
| EP | 1712802 A1 | 10/2006 |
| EP | 2199064 A1 | 6/2010 |
| EP | 2347888 A2 | 7/2011 |
| EP | 3578345 A1 | 12/2019 |

OTHER PUBLICATIONS

European Search Report for European Application No. EP 23162220.0, Completed by the European Patent Office, Dated Aug. 23, 2023, 7 pages.

European Examination for European Application No. 23162220.0 mailed Jun. 30, 2025, 5 pages.

* cited by examiner

*Primary Examiner* — Maria V Ewald
*Assistant Examiner* — Ethan Weydemeyer
(74) *Attorney, Agent, or Firm* — Brooks Kushman P.C.

(57) ABSTRACT

A structurally bonded arrangement comprising: an interconnecting component; a first component with a first connecting area that is rigidly connected to the interconnecting component; and a second component with a second connecting area that is structurally bonded to the interconnecting component in an associated bonding area; wherein a plurality of separated sub-bondings is formed in the associated bonding area between the second component and the interconnecting component.

20 Claims, 5 Drawing Sheets

STRUCTURALLY BONDED ARRANGEMENT

CROSS-REFERENCE TO RELATED APPLICATIONS

This application claims priority to European patent application No. EP 23162220.0 filed on Mar. 16, 2023, the disclosure of which is incorporated in its entirety by reference herein.

TECHNICAL FIELD

The disclosure is related to a structurally bonded arrangement that is suitable for use in a rotorcraft. The disclosure is further related to a rotorcraft that comprises such a structurally bonded arrangement.

BACKGROUND

A structurally bonded arrangement used in a rotorcraft must be comparatively strong and damage tolerant with high load transfer capabilities. Thus, a required robustness and, in consequence, a high reliability of a structurally bonded arrangement in a given rotorcraft may be achieved which is suitable to prevent loss of structural integrity in the given rotorcraft under any condition.

A major challenge in certification of structurally bonded arrangements which form bonded joints e.g. in aerospace applications resides in the demonstration of damage-tolerance and the proof of no-growth of potential defects in an associated bond line. In fact, a given bonded joint shall normally not be the weakest point when joining parts together, but in reality, cracks and crack propagation in respective bondings, i.e. associated adhesive layers of the given bonded joint, may occur. This may be the result of manufacturing imperfections, surface contamination of respective joining partners, local disbonding, defects due to damages according to impacts, and so on.

However, as a suitable inspection of bonded joints is comparatively difficult due to restricted accessibility and a limited obtainable quality of respective inspection methods, crack propagation is difficult to detect or to predict. Moreover, if a defect in a given bond line exists, it is almost impossible to identify the defect and to rate its size or characteristics with regular inspection and quality control methods. Due to this unpredictability of cracks/imperfections the defects may grow without control and/or without being recognized.

In general, a crack propagates when load above a certain level is applied repeatedly to a bonded joint. In this case, occurrence of the crack is due to stress conditions in the bonded joint, which are generally inherent to any bonding. More particularly, stress peaks in a lap shear bonding are almost inevitable by the structure-mechanic principle of such a bonding and a crack may lead to a sudden rupture of a complete bonding. As a consequence, the entire bonded joint may lose its load bearing capability if no crack-stopping features are implemented. Therefore, in current bonded joint designs separate crack-stopping features are introduced in respective bond lines, such as additional rivets, which shall stop any crack growth.

More specifically, shear stress concentration and respective shear stress peaks at both ends in transverse or width direction of a bond line of a lap shear bonding in a bonded joint represent generally a major structure-mechanical problem. Furthermore, besides the shear stress concentration and the respective stress peaks additional secondary and very detrimental stresses may occur in the bond line of the lap shear bonding and may reduce a transferrable load significantly. These secondary stresses impact adversely the sizing stress peak, which is mainly the peel-off stress that, in most cases, is the most critical stress component.

Although shear stress peaks in a lap shear bonding may be reduced by various different means, such means generally have no impact on the distribution of stresses in longitudinal or length direction of the bond line. More specifically, standard methods for shear stress peak reduction exist, such as additional rivets, but there are almost no features described about how to establish design principles to integrate damage-tolerance features, especially crack stoppers, into a lap shear bonding itself, in particular over an entire length of a given bond line.

In any case, it is important to note that influencing an underlying stress state of a lap shear bonding does not automatically mean that damage tolerance is achieved. Instead, damage tolerance and stress optimization are to be regarded separately. More particularly, the stress state in a lap shear bonding of a bonded joint is highly dependent on respective loading conditions which, thus, allow to influence stresses in the complete lap shear bonding. Accordingly, there are different possibilities for influencing the stresses, as well as associated fail-safe-capabilities.

For instance, the document EP 2 199 064 A1 describes a bonded joint between two different components which abut in longitudinal or length direction against each other, with a through-thickness form-fit connection and a but joint bonding, i.e. a bonding along the abutment. Similarly, the documents EP 2 347 888 A2 and U.S. Pat. No. 2,391,731 A also describe a combination of an end-shape pattern with form-fit function and a but joint bonding.

The document US 2020/0369359 A1, in turn, describes a bonded joint of two components which overlap in vertical or height direction in mutually opposed end sections provided with wave-shaped edges, wherein the bonding is provided in a respective overlap region. Similarly, the document U.S. Pat. No. 1,773,068 A describes a bonded joint between two components which are further connected to each other by means of a form-fit connection. Furthermore, the document EP 3 578 345 A1 describes a butt joint between two components which are interconnected in vertical or height direction by means of a form-fit connection, but without being bonded. Likewise, the documents EP 1 712 802 A1, DE 2 441 470 A1, and U.S. Pat. No. 3,253,842 A describe unbonded connections between two components by means of form-fit connections forming associated interlocking patterns.

SUMMARY

It is an object of the present disclosure to provide a new design principle for a damage tolerant bonded joint with high load transfer capability and, more particularly, a new structurally bonded arrangement that is comparatively strong and damage tolerant with high load transfer capabilities. It is a further object of the present disclosure to provide a rotorcraft comprising such a new structurally bonded arrangement.

This object is solved by a structurally bonded arrangement. More specifically, according to the present disclosure a structurally bonded arrangement is provided that comprises an interconnecting component, a first component with a first connecting area that is rigidly connected to the interconnecting component, and a second component with a second connecting area that is structurally bonded to the interconnecting component in an associated bonding area. A plurality of separated sub-bondings is formed in the associated bonding area between the second component and the interconnecting component.

Advantageously, the second component is structurally bonded to the interconnecting component in the associated bonding area, which forms a single bond line, by the plurality of separated sub-bondings instead of one single bonding. In other words, the single bond line formed by the associated bonding area is divided into the plurality of separated sub-bondings. Thus, if a crack occurs in the single bond line, i.e. at one of the plurality of sub-bondings, it cannot grow from this sub-bonding to another sub-bonding as the division of the bond line into the plurality of separated sub-bondings acts as crack stopper. Accordingly, the inventive structurally bonded arrangement exhibits a fail-safe characteristic, is damage tolerant, and increases safety in aerospace applications as the single bond line of the structurally bonded arrangement is less sensitive to local cracks, manufacturing defects and damages from outside.

More specifically, the damage tolerance advantageously enables omission of conventionally required additional crack-stopping elements. Furthermore, a relief for inspections is enabled by characteristic and respective the fail-safe requirements for repairs decrease as well, as an underlying threat of potential continuous crack growth is limited under a known damage. Moreover, shape and size of the plurality of separated sub-bondings may be designed to make possible damage sizes and their impacts predictable and, thus, easily assessable by stress calculations. Accordingly, expensive crack-growth calculations and tests are no more required. As a result, the inventive structurally bonded arrangement presumably fulfills applicable certification requirements and is, thus, potentially certifiable.

In addition, the inventive structurally bonded arrangement is simple and may be manufactured in a cost-efficient manner as all sub-bondings of the plurality of separated sub-bondings may be manufactured at the same time and are regarded as one single bonding from a manufacturing point of view, as they form the single bond line along the associated bonding area. Furthermore, by also structurally bonding the first component to the interconnecting component, the inventive structurally bonded arrangement may be designed as a double lap shear bonding having the same working principle, which would increase load transferring capabilities.

Advantageously, the inventive structurally bonded arrangement is independent on an underlying material selection and combination with respect to the first, second and interconnecting components. In other words, all qualified materials and also bonding processes can be used and no additional pre-treatment or process is required. It generally enables saving of costs, manufacturing time and weight compared to conventional aerospace joining technologies, such as e.g. riveting.

In an illustrative realization, the inventive structurally bonded arrangement comprises two flat parts or panels forming the first and second components, and a splice plate forming the interconnecting component, wherein the two flat parts are structurally bonded to the splice plate in the associated bonding area, which forms a single bond line, by the plurality of separated sub-bondings. The splice plate preferably connects the two flat parts in a lap shear manner via the bonding area. The single bond line formed by the associated bonding area is divided into the plurality of separated sub-bondings by means of a particular shaping of the mutually opposed ends of the two flat parts. This particular shaping forms preferably an intermeshing pattern which separates the two flat parts and divides the single bond line into comparatively small sub-bondings in longitudinal or length direction of the single bond line. An underlying width of the splice plate preferentially corresponds to the width of the intermeshing pattern. The intermeshing pattern, i.e. the particular shaping of the mutually opposed ends of the two flat parts may have different shapes, such as sine-form shapes, trapezoidal shapes, rectangular shapes, a chain of half-circles shapes or any combination thereof. These shapes may be adapted with respect to different requirements, such as a particular main load direction applied to the inventive structurally bonded arrangement, underlying geometric dimensions of the inventive structurally bonded arrangement, and/or the criticality or required level of robustness or acceptable maximum damage size or failure size, respectively.

Advantageously, dividing the single bond line formed between the two flat parts and the splice plate into the plurality of separated sub-bondings allows to split up a comparatively long bond line into many independent small sub-bondings. This independency enables a simplified analysis and substantiation approach as from a robustness point of view the substantiation principle is similar to a line of rivets: In an application with several rivets it is allowed that one or two rivets fail without severely impacting the functionality of the complete joint. This applies likewise to the independent small sub-bondings: if one or two sub-bondings fail, the functionality and integrity of the bond line is nevertheless still guaranteed.

Accordingly, as already explained above, the division of the single bond line into the plurality of separated sub-bondings allows to stop a crack occurring in the bond line as the crack cannot propagate between adjacent sub-bondings, as it would have to cross a gap the separates the sub-bondings. Thus, even if there is crack growth within one sub-bonding for any reason, e.g. if a corresponding stress-level is too high, the crack is stopped at the latest at the edges of the sub-bonding as the crack cannot propagate to an adjacent sub-bonding. Consequently, a given damage may only grow up to the size of an associated sub-bonding.

More specifically, the division of the single bond line into the plurality of separated sub-bondings intentionally creates a non-equal distribution of stresses along an underlying running length of the bond line resp. the splice plate in order to establish a pattern of higher and lower loaded zones along the bond line. This is due to the fact that the stress state varies within the one sub-pattern as the overlap length changes over the running length of the bond line. The effect is that normally cracks can be stopped in regions with lower stress: In case a crack occurs in one sub-bonding due to any reason, such as e.g. weak bonding, impact damage, unexpected local overload, etc., the crack stops as soon as the crack tip reaches a region with low load level. This is a kind of opportunity to predict the damage and its impact on the structure.

However, as with a failed area the adjacent areas have to take more loads, sub-bondings which are adjacent to a failed sub-bonding have to take more load. As a result, the crack stop feature provided by the plurality of separated sub-bondings and, consequently, the fail-safe design of the structurally bonded arrangement consisting of the two flat parts and the splice plate is established during sizing of the associated bonding area, i.e. the bond line: In analysis, the failure of a sub-bonding and the load transfer to the adjacent sub-bondings is considered and it is ensured that the load level remains below crack initiation in the adjacent sub-bondings.

In addition to the provision of the plurality of separated sub-bondings, supplementary measures may be taken in order to decrease detrimental stress-peaks. More specifically, such supplementary measures may be provided in order to reduce stress peaks at the edges of the bond line significantly. This reduces the impact of the increased load level which is to be transferred by all remaining intact sub-bondings. These supplementary measures are to be regarded to be applied as separate and additional features which may lead to a smoother distribution of stresses in the bond line.

Furthermore, the provision of the plurality of separated sub-bondings is also advantageous with respect to peel-off stresses. More specifically, as the basic structure-mechanical principle of a single lap shear bonding consists of the detrimental secondary effect of secondary bending, adverse peel-off stresses are generated which normally reduce the allowable load level significantly. However, with the separation of the bond line into zones of high and low load transfer, the peel-off stresses are forced to be non-constant over the bond line length and may advantageously be reduced in areas with high load transfer where they act mostly on the bond line. Thus, they may be "tuned" in a way to be increased in regions with low load transfer where their action on the bond line is neglectable.

According to some aspects, the first connecting area of the first component is structurally bonded to the interconnecting component in the associated bonding area for rigidly connecting the first component to the interconnecting component, and another plurality of separated sub-bondings is formed in the associated bonding area between the first component and the interconnecting component.

Preferably, the first connecting area and the second connecting area are structurally bonded to a same side of the interconnecting component.

Preferably, the first connecting area and the second connecting area are spaced apart from each other on the interconnecting component to form an interspace.

The first connecting area and the second connecting area may be alternatingly connected to the interconnecting component in a length direction of the associated bonding area to form the plurality of separated sub-bondings and the other plurality of separated sub-bondings.

Preferably, the first connecting area and the second connecting area form an intermeshing pattern on the interconnecting component that separates the associated bonding area in its length direction into the plurality of separated sub-bondings and the other plurality of separated sub-bondings.

Advantageously, a respective shaping of the intermeshing pattern may be adapted in angle, width, and length of the interconnecting component to any geometrical constraint and loading condition, thus, enabling extreme high adaptability to any design context. Furthermore, a comparatively simple manufacturing is enabled as the intermeshing pattern may be manufactured by trimming of an existing geometry to a zigzag line or any other shape. In fact, various different patterns for end shapes may be implemented according to a best suitable manufacturing process. Moreover, a possibly implemented splicing may be combined with any other means for manufacturing of the inventive structurally bonded arrangement, such as e.g. spacers or patterns in the associated bonding area itself, which increases reliability and simplifies manufacturing.

The first connecting area may comprise a first edge with a first shape, and the second connecting area may comprise a second edge with a second shape that fits to the first shape to form the intermeshing pattern.

The first shape and the second shape may form one of a triangle wave, a trapezoidal wave, a sine wave, a square wave, a zigzag line, a sawtooth line, a chain of half-circles, or an arbitrary combination thereof.

According to some aspects, the first component and the second component are panels or shells of a rotary wing aircraft, in particular fiber reinforced polymer panels or shells.

The interconnecting component may be one of a joggled panel, a shell, a stringer, a rib, a frame or a beam of the rotary wing aircraft.

According to some aspects, the interconnecting component is a connecting plate that connects the first component and the second component to each other in a lap shear manner.

The connecting plate may comprise a width that equalizes at least approximately a respective width of the intermeshing pattern.

Preferably, the plurality of separated sub-bondings and the other plurality of separated sub-bondings are embodied to prevent upon occurrence of a crack growth of the crack between adjacent sub-bondings in the associated bonding area.

According to some aspects, the first component and the second component are interconnected in a form-fit-free manner via the interconnecting component. Preferably, the first component and the second component are also connected in a form-fit-free manner to the interconnecting component, i.e. only by means of bonding.

The present disclosure further provides a rotorcraft with a structurally bonded arrangement as described above.

BRIEF DESCRIPTION OF DRAWINGS

Preferred embodiments of the disclosure are outlined by way of example in the following description with reference to the attached drawings. In these attached drawings, identical or identically functioning components and elements are labelled with identical reference signs and are, consequently, only described once in the following description.

DETAILED DESCRIPTION

Figure 1:
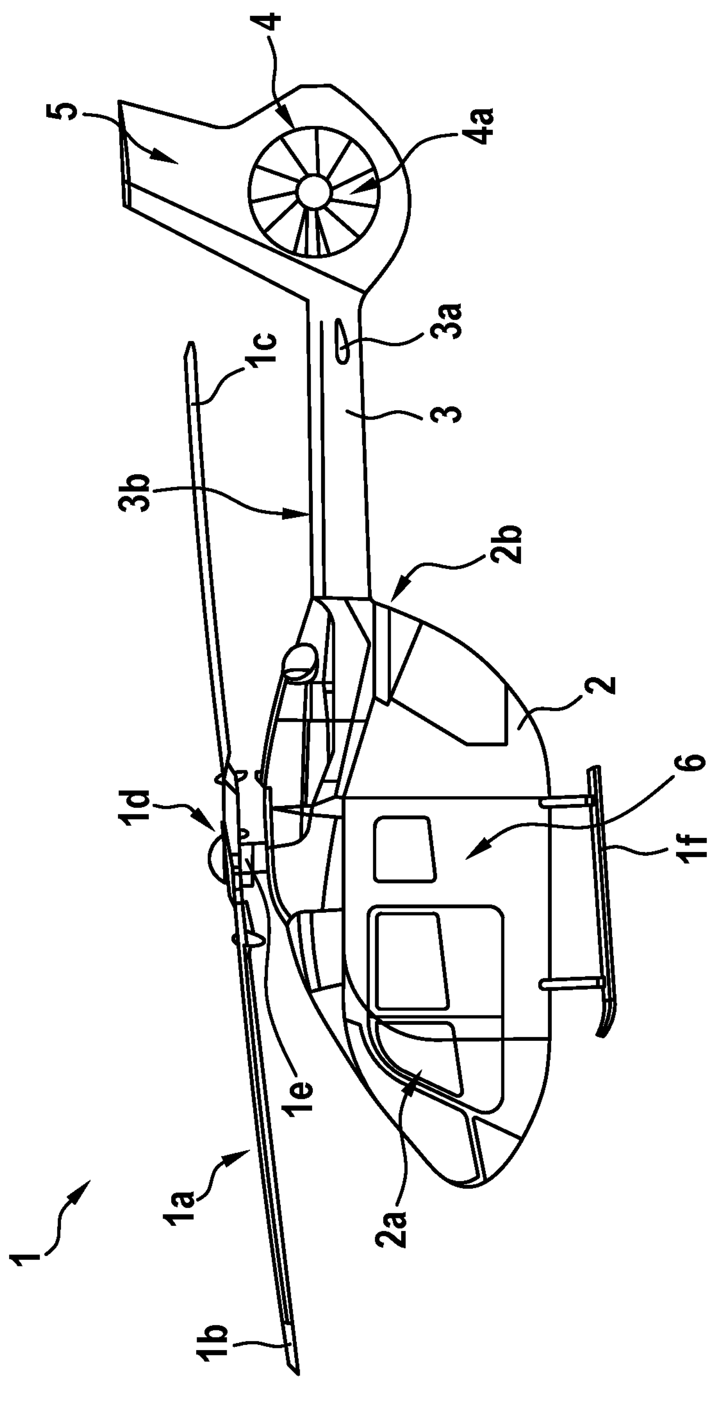
FIG. 1 shows a lateral view of a rotorcraft with a fuselage that comprises a structurally bonded arrangement according to the disclosure.

Figure shows an aircraft 1 that is illustratively embodied as a rotorcraft and, more particularly, as a helicopter. Thus, for purposes of simplicity and clarity, the aircraft 1 is hereinafter referred to as the "helicopter 1".

Illustratively, the helicopter 1 comprises at least one main rotor 1*a*, preferably a multi-blade main rotor, for providing lift and forward or backward thrust during operation. By way of example, the at least one main rotor 1*a* comprises a plurality of rotor blades which are connected at an associated rotor head 1*d* to a rotor shaft 1*e*, which rotates in operation of the helicopter 1 about an associated rotor axis. Two rotor blades of the plurality of rotor blades are illustratively separately labelled with the reference signs 1*b*, 1*c*.

Furthermore, the helicopter 1 comprises a fuselage 2. By way of example, a left-hand side of the fuselage 2 is shown and, thus, a portside wall of the fuselage 2 of the helicopter 1, to which a landing gear 1*f* of the skid-type is attached. The fuselage 2 may form an aircraft interior region that accommodates a cockpit 2*a* and that may further accommodate a cabin for passengers and/or cargo.

Illustratively, the fuselage 2 comprises at least one structurally bonded arrangement 6. The structurally bonded arrangement 6 is described in detail below at FIG. 2 to FIG. 8.

Moreover, the fuselage 2 of the helicopter 1 is connected at a rear fuselage 2*b* to a tail boom 3 with a horizontal stabilizer 3*a*. The tail boom 3 may be implemented as a slim beam element that comprises at least a tubular tail boom cone 3*b*.

The helicopter 1 illustratively further comprises at least one preferentially shrouded counter-torque device 4 configured to provide counter-torque during operation, i.e. to counter the torque created by rotation of the at least one main rotor 1*a* for purposes of balancing the helicopter 1 in terms of yaw. The at least one counter-torque device 4 is illustratively provided at an aft section of the tail boom 3 and preferably comprises a tail rotor 4*a*. The aft section of the tail boom 3 preferably further comprises a fin 5.

Figure 2:
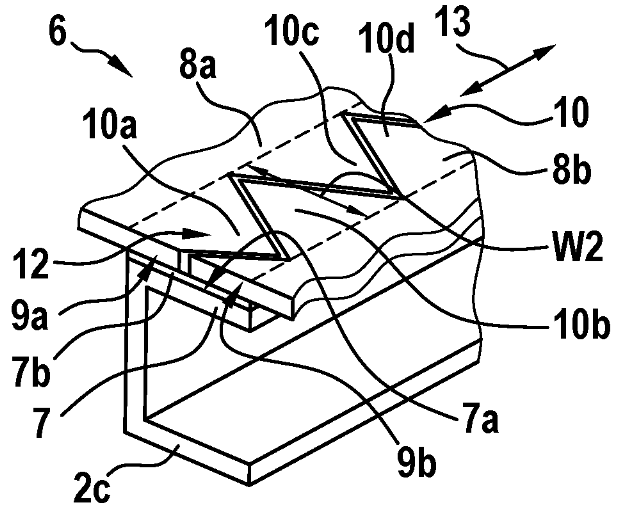
FIG. 2 to FIG. 4 show enlarged detail views of the structurally bonded arrangement of FIG. 1.

FIG. 2 shows the structurally bonded arrangement 6 of the helicopter 1 of FIG. 1 with a component 8*a*, a component 8*b*, and an interconnecting component 7. The present disclosure is, however, not limited to use of the structurally bonded arrangement 6 in helicopters and may likewise be used in any other aircraft and, more generally, in any other vehicle, such as a car, a truck, a train, a ship, and so on.

The component 8*a* comprises a connecting area 9*a* that is rigidly connected to the interconnecting component 7. The component 8*b*, in turn, comprises a connecting area 9*b* that is structurally bonded to the interconnecting component 7 in a bonding area 10. A plurality of separated sub-bondings 10*b*, 10*d* is formed in the bonding area 10 between the component 8*b* and the interconnecting component 7.

By way of example, the interconnecting component 7 may be implemented as a joggled panel with the component 8*a, i*. e. be an integral part of the component 8*a*. Alternatively, as illustrated in FIG. 2, the connecting area 9*a* of the component 8*a* may also be structurally bonded to the interconnecting component 7 in the bonding area 10 for rigidly connecting the component 8*a* to the interconnecting component 7 such that another plurality of separated sub-bondings 10*a*, 10*c* is formed in the bonding area 10 between the component 8*a* and the interconnecting component 7.

Preferably, the connecting areas 9*a*, 9*b* are structurally bonded to a same side 7*a* of the interconnecting component 7 in the bonding area 10, e.g. by means of a suitable adhesive layer 7*b*. Illustratively, the connecting areas 9*a*, 9*b* are alternatingly connected to the interconnecting component 7 in a length direction 13 of the bonding area 10 to form the separated sub-bondings 10*a*, 10*b*, 10*c*, 10*d*.

More specifically, the connecting areas 9*a*, 9*b* and, thus, the components 8*a*, 8*b* preferably form an intermeshing pattern 12 on the interconnecting component 7 that separates the bonding area 10 in its length direction 13 into the separated sub-bondings 10*a*, 10*b*, 10*c*, 10*d*. The sequencing of the separated sub-bondings 10*a*, 10*b*, 10*c*, 10*d* in the length direction 13 forms a bond line extending in the length direction 13.

It should be noted that only four separated sub-bondings are individually labelled with the reference signs 10*a*, 10*b*, 10*c*, 10*d*, for simplicity and clarity of the drawing. However, it is clear that the bond line may be composed of a huge number of separated sub-bondings, wherein the exact number may be determined in an application-specific manner, e.g. dependent on a respectively selected intermeshing pattern and shaping.

It should further be noted that the intermeshing pattern 12 does not embody a form-fit connection between the components 8*a*, 8*b* that locks the components 8*a*, 8*b* against each other. Instead, the components 8*a*, 8*b* are only interconnected by means of the bonding area 10, i.e. via the adhesive layer 7*b* on the interconnecting component 7. In other words, the components 8*a*, 8*b* are arranged with respect to each on the interconnecting component 7 to form the intermeshing pattern 12, but they are only interconnected in a form-fit-free manner via the interconnecting component 7. Likewise, the components 8*a*, 8*b* are connected in a form-fit-free manner to the interconnecting component 7, i.e. only via bonding, i.e. by means of the adhesive layer 7*b*.

The intermeshing pattern 12 has illustratively a width W2 that equalizes at least approximately and within predetermined manufacturing tolerances a width of the bonding area 10, and also a width of the interconnecting component 7. The width W2 corresponds to the width of the bond line formed by the sequencing of the separated sub-bondings 10*a*, 10*b*, 10*c*, 10*d*.

By way of example, the interconnecting component 7 is a frame 2*c* of the helicopter 1 of FIG. 1. Alternatively, the interconnecting component 7 may be one of a shell, a stringer, a rib, or a beam of the helicopter 1, or a joggled panel as described above. Accordingly, the components 8*a*, 8*b* may be panels or shells of the helicopter 1 of FIG. 1, e.g. fiber reinforced polymer panels or shells. Such fiber reinforced polymer panels or shells may comprise carbon fiber reinforced polymers, but may alternatively comprise also other kinds of reinforcement fibers, such as glass, aramid and so on.

However, it should be noted that the structurally bonded arrangement 6 is independent on an underlying material selection and combination with respect to the first, second and interconnecting components 8*a*, 8*b*, 7. In other words, all qualified materials and also bonding processes can be used and no additional pre-treatment or process is required.

Figure 3:
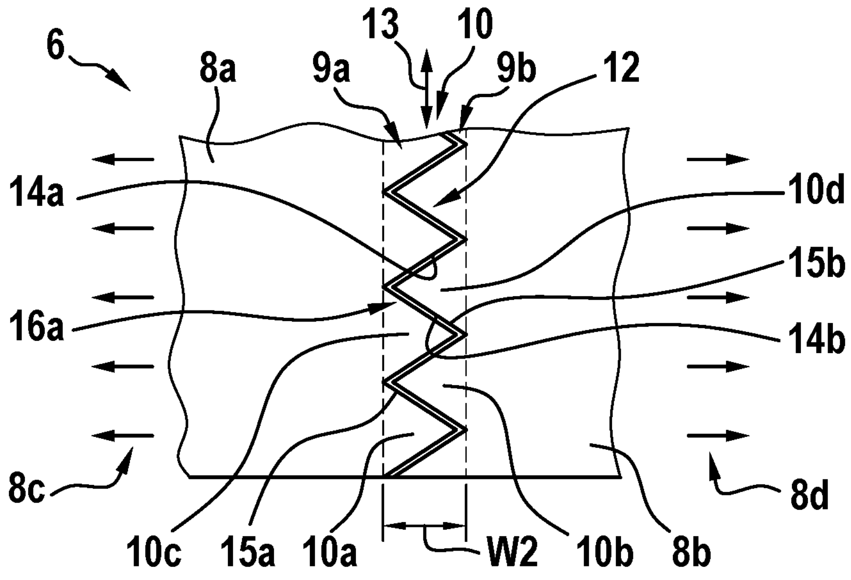

FIG. 3 shows the structurally bonded arrangement 6 of FIG. 2 with the components 8*a*, 8*b* which comprise the connecting areas 9*a*, 9*b* which are structurally bonded to the interconnecting component 7 of FIG. 2 in the bonding area 10 such that the separated sub-bondings 10*a*, 10*b*, 10*c*, 10*d* are formed in the bonding area 10. The interconnecting component 7 is, however, not visible as such as the structurally bonded arrangement 6 is shown in top view, but it is indicated by two dotted lines.

As described above at FIG. 2, the components 8*a*, 8*b* and, more specifically, the connecting areas 9*a*, 9*b* form the intermeshing pattern 12 that separates the bonding area 10 in its length direction 13, i.e. the bond line, into the separated sub-bondings 10*a*, 10*b*, 10*c*, 10*d*. The intermeshing pattern 12 has the width W2.

Illustratively, the connecting area 9*a* comprises an edge 14*a* with a shape 15*a*. The connecting area 9*b*, in turn, comprises an edge 14*b* with a shape 15*b* that fits to the shape 15*a* to form the intermeshing pattern 12.

The shapes 15*a*, 15*b* may form a triangle wave 16*a* such that the bonding area 10 is provided with the triangle wave 16*a* extending in the length direction 13. However, other shapes of the edges 14*a*, 14*b* may also be implemented and are likewise contemplated, as explained by way of example below at FIG. 7 and FIG. 8.

Illustratively, the edges 14*a*, 14*b* face each other in the bonding area 10 of the structurally bonded arrangement 6. The bonding area 10 with the separated sub-bondings 10*a*, 10*b*, 10*c*, 10*d* implements preferably a lap shear bonding which is embodied to withstand shear forces 8*c*, 8*d*. The shear forces 8*c*, 8*d* are illustratively diametrically opposed and applied at least approximately perpendicular to the length direction 13 of the bonding area 10.

It should be noted that the shear forces 8*c*, 8*d* are the forces acting on the bonding area 10 which are mainly relevant for pulling apart the components 8*a*, 8*b*. However, other (shear) forces may likewise act on the bonding area 10 and were simply omitted for simplicity and clarity of the drawing.

Figure 4:
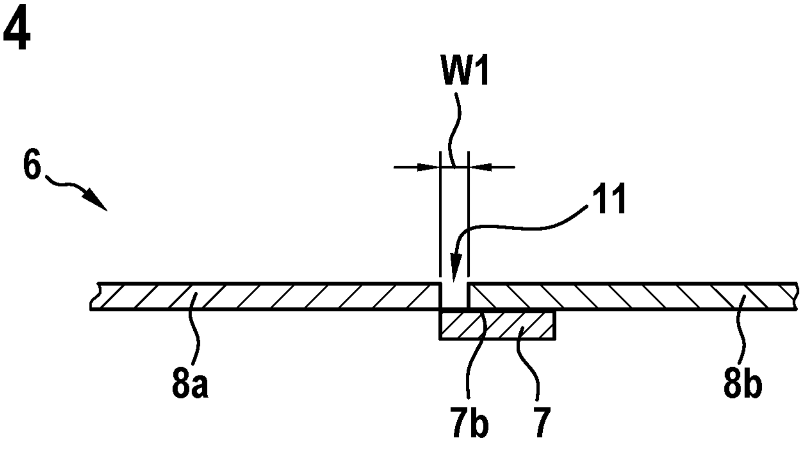

FIG. 4 shows the structurally bonded arrangement 6 of FIG. 2 and FIG. 3 with the components 8*a*, 8*b* which are structurally bonded to the interconnecting component 7 by means of the suitable adhesive layer 7*b* of FIG. 2. The components 8*a*, 8*b* and, more specifically, the connecting areas 9*a*, 9*b* in FIG. 2 and FIG. 3, are spaced apart from each other on the interconnecting component 7 to form an interspace 11 having a predetermined width W1.

Figure 5:
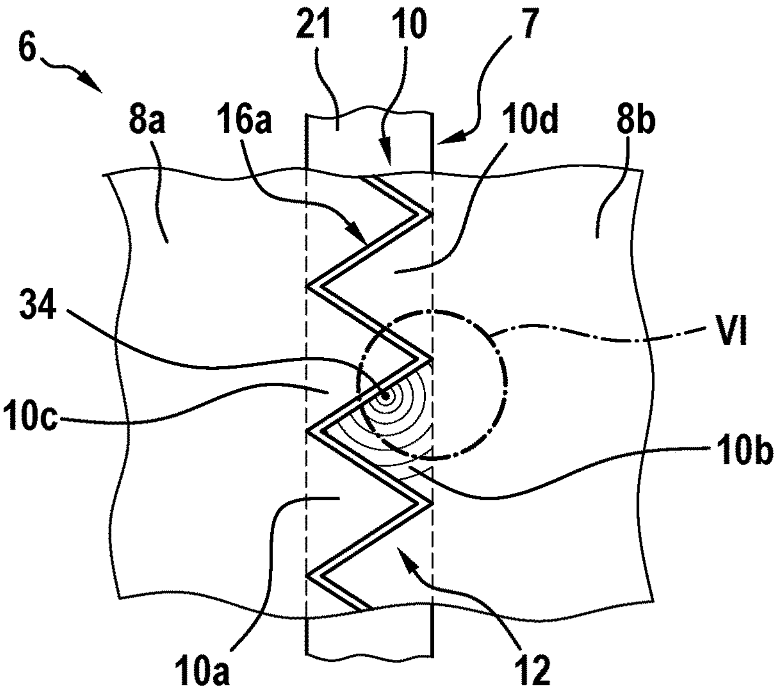
FIG. 5 shows a top view of the structurally bonded arrangement of FIG. 2 to FIG. 4 with an illustrative crack and associated crack growth.

FIG. 5 shows the structurally bonded arrangement 6 of FIG. 2 to FIG. 4 with the components 8*a*, 8*b* which are structurally bonded in the bonding area 10 to the interconnecting component 7. The components 8*a*, 8*b* form the intermeshing pattern 12 with the triangle wave 16*a* according to FIG. 3, which separates the bonding area 10 into the separated sub-bondings 10*a*, 10*b*, 10*c*, 10*d*.

Preferably, the interconnecting component 7 is plate-shaped and, accordingly, illustratively embodied as a connecting plate 21 that connects the components 8*a*, 8*b* to each other in a lap shear manner. More specifically, the connecting plate 21 may be a splice plate.

In addition, FIG. 5 shows a crack 34 occurring by way of example in the sub-bonding 10*b*. The crack 34 may grow in the sub-bonding 10*b*, as described hereinafter at FIG. 6.

Figure 6:
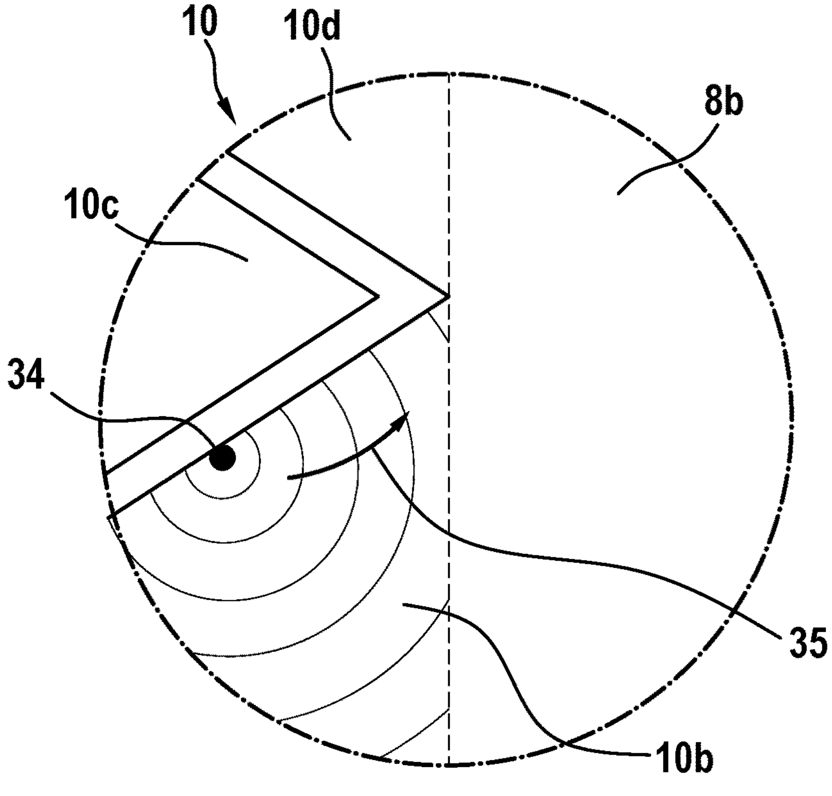
FIG. 6 shows an enlarged detail view of the structurally bonded arrangement of FIG. 5.

FIG. 6 shows the bonding area 10 of FIG. 5 with the separated sub-bondings 10*b*, 10*c*, 10*d*, as well as with the crack 34 which occurs in the sub-bonding 10*b*. The bonding area 10 is delimited with respect to the component 8*b* as illustrated with a dashed line.

As described above, the sub-bonding 10*b* is separated from the sub-bondings 10*c*, 10*d*. Preferably, the sub-bonding 10*b* and, more generally, each one of the sub-bondings in the bonding area 10 is embodied to prevent upon occurrence of a crack growth of the crack between adjacent independent sub-bondings in the bonding area 10. Thus, the crack 34 may grow in the sub-bonding 10*b*, as illustrated with an arrow 35 and corresponding propagation wave lines, but the crack growth is stopped at the borders of the sub-bonding 10*b*. Consequently, failure of the sub-bonding 10*b* may not result in failure of other sub-bondings.

Figure 7:
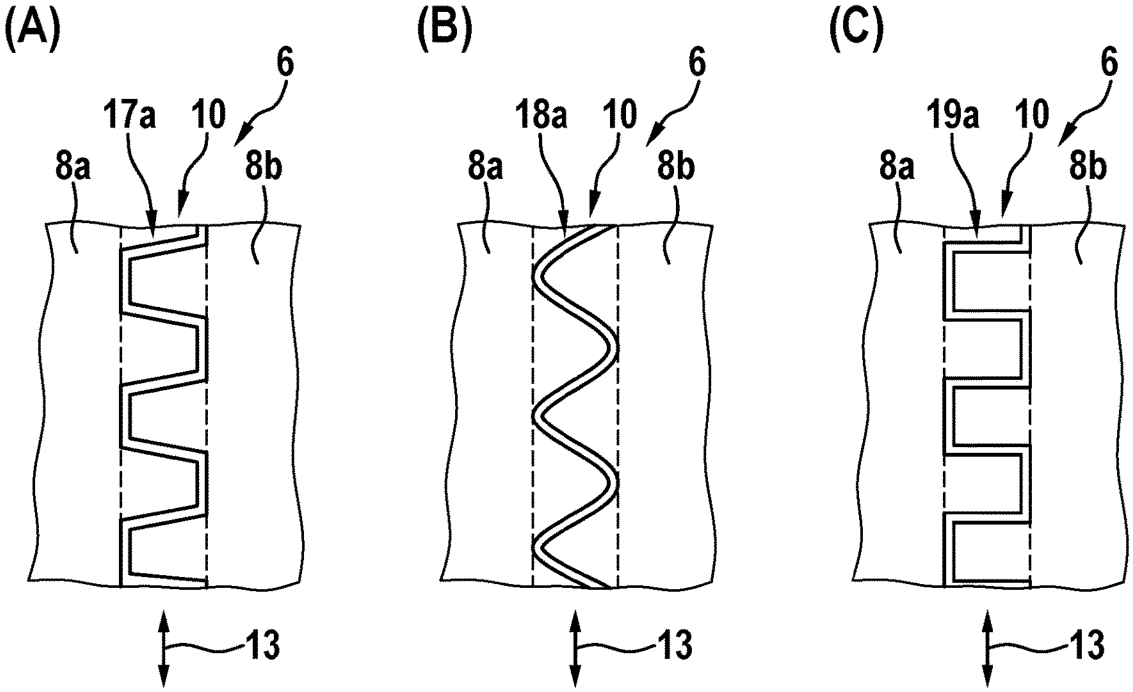
FIG. 7 and FIG. 8 show top views of alternative structurally bonded arrangements.

FIG. 7 shows in parts (A) to (C) the structurally bonded arrangement 6 of FIG. 3 with the components 8*a*, 8*b* which are structurally bonded in the bonding area 10. However, in contrast to FIG. 2 and FIG. 3, the bonding area 10 is now provided in part (A) with a trapezoidal wave 17*a* formed by the components 8*a*, 8*b*, in part (B) with a sine wave 18*a* formed by the components 8*a*, 8*b*, and in part (C) with a square wave 19*a* formed by the components 8*a*, 8*b*.

Figure 8:
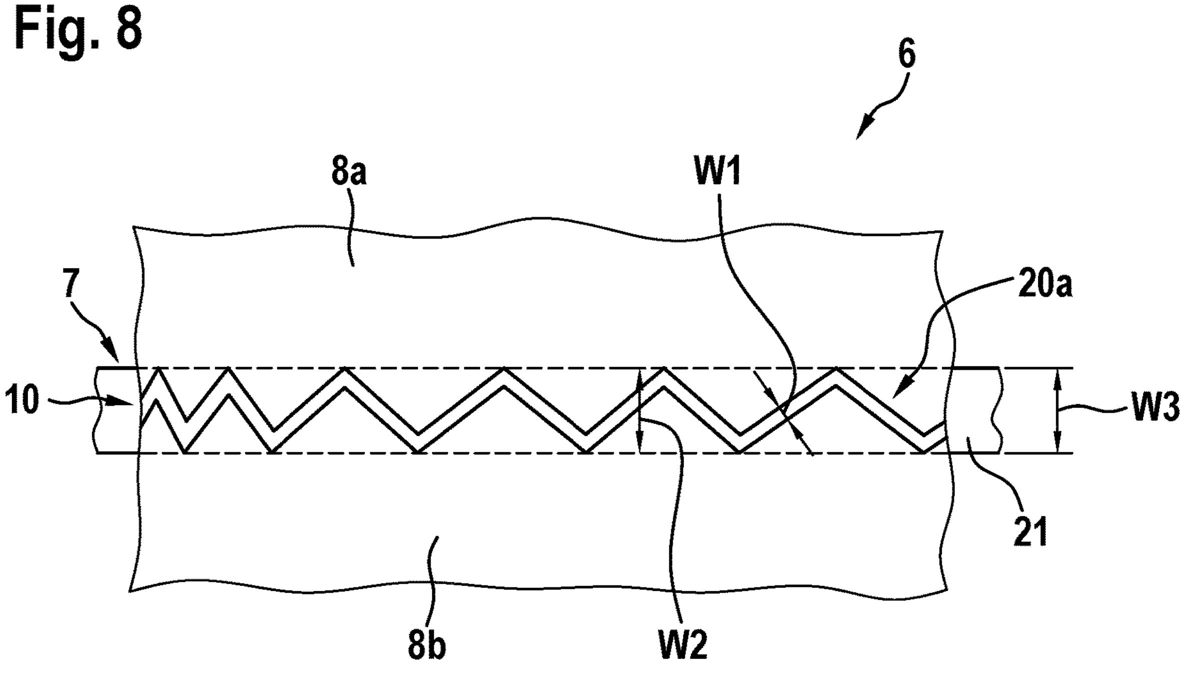

FIG. 8 shows the structurally bonded arrangement 6 of FIG. 3 with the components 8*a*, 8*b* which are structurally bonded to the interconnecting component 7 in the bonding area 10. However, in contrast to FIG. 3, the bonding area 10 is now provided with a zigzag line 20*a* such that separated sub-bondings with different shapes are provided, which is beneficial to increase robustness of the bonding area 10 locally.

FIG. 8 further illustrates the widths W1 of FIGS. 4 and W2 of FIG. 3, as well as a width W3 of the interconnecting component 7. The width W1 may vary along the bonding area 10.

By way of example, the interconnecting component 7 is embodied by means of the connecting plate 21 of FIG. 5. Thus, the connecting plate 21 has the width W3, which equalizes at least approximately within predetermined manufacturing tolerances the width W2, i.e. the width of the intermeshing pattern 12 of FIG. 3.

Figure 9:
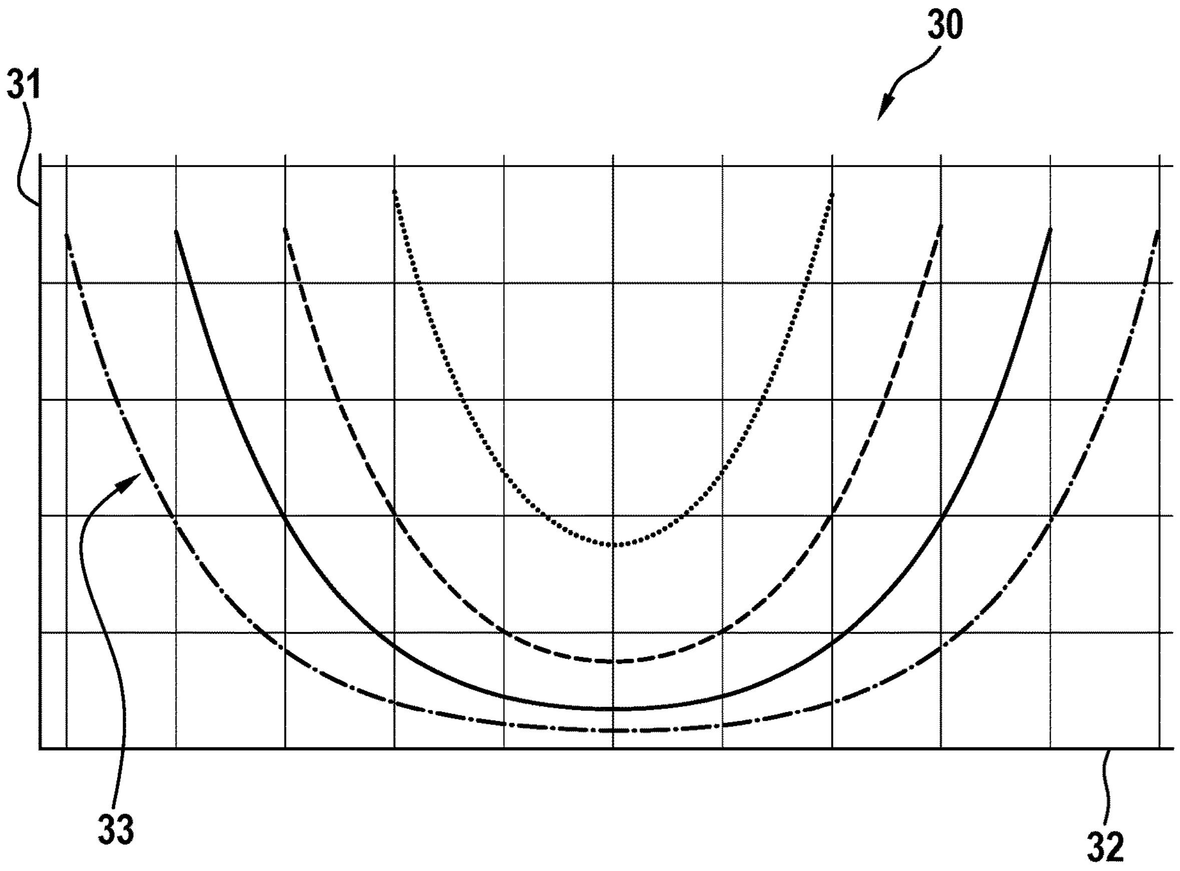
FIG. 9 shows a shear stress diagram with illustrative shear stress curves.

FIG. 9 shows an illustrative shear stress diagram 30 that exemplifies stress states 31 dependent on an overlap length 32. More specifically, different shear stress curves 33 are shown to illustrate by way of example the dependency of the stress states in the bonding area 10 of FIG. 2 and FIG. 3 from an associated overlap length formed in the length direction 13 of FIG. 2 and FIG. 3 between the components 8*a*, 8*b* and the interconnecting component 7 of FIG. 2 and FIG. 3. As can be seen from FIG. 9, the variation of overlap length impacts the magnitude and shape of stresses in the bonding area 10 and may, thus, be used as a design parameter to achieve a desired stress state or level of damage tolerance.

It should be noted that modifications to the above described embodiments are within the common knowledge of the person skilled in the art and, thus, also considered as being part of the present disclosure. For instance, according to FIG. 3, FIG. 7 and FIG. 8 the bonding area 10 may be provided with a triangular wave 16*a*, a trapezoidal wave 17*a*, a sine wave 18*a*, or a square wave 19*a*. However, other shapes may also be implemented, such as a sawtooth line, a chain of half-circles, or an arbitrary combination of all described shapes.

Finally, it is again pointed out that all sub-bondings described above belong to a single and same bond line. However, they are separated areas which are separated by gaps, i.e. by the interspace 11 of FIG. 4. Thus, cracks or other flaws cannot propagate to an adjacent sub-bonding as the independent sub-bondings are separated by gaps. All sub-bondings together compose the complete bond line for the complete load transfer, as all sub-bondings act together for load transfer.

Basic principle is as well that the independent sub-bondings are preferably relatively small in relation to the overall length of the complete bond line in the length direction 13 of FIG. 3. It is important to consider the sub-bondings as being a "small" part of the complete bond line: All theory of bonded joints shall still be applicable as the independent sub-bondings are assessed as being one single complete bonding, but with special features. All independent sub-bondings have to be assessed separately, but in reality, can be covered by looking at the highest loaded sub-bonding only.

Advantageously, the split up into many sub-bondings limits a maximum damage size even with a fatigue crack which grows over time to one completely failed sub-bonding. This is similar to the design and sizing of rivet lines: the failure of one rivet is acceptable as long as the number of rivets is big enough so that the remaining rivets ensure the structural integrity. This is transferable to the bonding design with many independent separated sub-bondings as described: the sub-bondings have to be small enough. With the sub-division into many sub-bondings there is almost no global impact on the complete bond line: The loads which are normally transferred by a small failed sub-bonding are shifted to adjacent sub-bondings. And as the fraction of the load transfer by the failed sub-bonding is low, the increase of loads and stresses is acceptable when the sizing was performed beforehand in a way that the additional local loads can be transferred.

An additional benefit of the independent separated sub-bondings is related to their shapes and the effect that non-constant cross-sections for the sub-bonding pattern causes an alternating stress state along the bond line's running length. In case a crack occurs, it propagates till the location of the minimum cross-section where the crack in the sub-bonding finally ends at the edge of the interconnecting component and the bonding area. Even if the crack propagates, the increasing cross-sections of the independent separate sub-bonding lead to a slow-down of the crack propagation velocity. This is valid for all separated sub-bondings and this effect simply is achieved with the triangular or trapezoidal or sine-form shape of the sub-bondings, or other almost arbitrary shapes. In this manner, a high fail-safe level of the complete bond line can be achieved which simplifies the certification of the design by the competent authorities, which is currently a major obstacle in the efforts to design certifiable structural bondings. Moreover, it offers relief for inspections and the requirements for repairs as the threat of continuous crack growth is limited under a known damage.

Another effect of the intermeshing pattern of the structurally bonded components is the fact that an unequal distribution of stresses is generated along the running length of the bond line. This offers opportunities to stop a crack from growing, as in areas with lower loads the crack loses its energy at the crack tip before the crack reaches the border to an adjacent sub-bonding or end of the structurally bonded component. The individual shapes of the sub-bondings influence the distribution of stresses and areas with high and low stresses are the consequence. In the areas of low stress level, the cracks can be stopped even before they reach the limit of the sub-bonding at its borders, i.e. its edge or the gap resp. interspace. This feature of stopping cracks in lower loaded regions is included in the inventive structurally bonded arrangement itself.

A positive side effect is that due to the inherent offset of the structurally bonded components with respect to the interconnecting component a small bending moment is generated which tries to turn the ends of the structurally bonded components and the interconnecting component against each other. However, due to the intermeshing pattern the interconnecting component is no longer loaded in the same way all along the running length of the bond line, but instead the loading alternates. In consequence, the moment is alternating as well. As the interconnecting component has a certain stiffness in torsion, this stiffness counteracts against the external moment and tends to reduce peel-off stresses locally, which is beneficial for the stress-peaks. In consequence, the load transfer capability can be increased by this alternating, intermeshing pattern of the two structurally bonded components in combination with the interconnecting component.

Finally, it should be noted that in all embodiments described above the connecting areas of the components form the intermeshing pattern on the interconnecting component that separates the bonding area in its length direction into the separated sub-bondings, and that the sequencing of the separated sub-bondings in the length direction forms the bond line extending in the length direction. Thereby, the connecting areas may be shaped as triangle waves, trapezoidal waves, sine waves, square waves, zigzag lines, sawtooth lines, chains of half-circles, or arbitrary combinations thereof, while the interconnecting component is always described as a straight component, in particular a straight splice plate. However, in contrast thereto the splice plate may also be shaped as a triangle wave, a trapezoidal wave, a sine wave, a square wave, a zigzag line, a sawtooth line, a chain of half-circles, or an arbitrary combination thereof. This results in further design possibilities to influence load distribution in the sub-bondings and, hence, to optimize a respective load carrying capability of the bonding. Accordingly, this offers opportunities to control and distribute stresses to areas which still have load transfer capabilities. Moreover, the connecting areas may be implemented as straight components if the splice plate is shaped as a triangle wave, a trapezoidal wave, a sine wave, a square wave, a zigzag line, a sawtooth line, a chain of half-circles, or an arbitrary combination thereof. A major benefit of this solution is the reduction of the complexity of the shaping of all bonded components to the shaping solely of the splice plate, thus, reducing a respective manufacturing effort to a single component.

REFERENCE LIST

1 rotorcraft
1*a* multi-blade main rotor
1*b*, 1*c* rotor blades
1*d* rotor head
1*e* rotor shaft
1*f* landing gear
2 fuselage
2*a* cockpit
2*b* rear fuselage
2*c* frame
3 tail boom
3*a* horizontal stabilizer
3*b* tail boom cone
4 counter-torque device
4*a* tail rotor
5 vertical stabilizer
6 structurally bonded arrangement
7 interconnecting component
7*a* interconnecting component bonding side
7*b* adhesive layer
8*a*, 8*b* bonded components
8*c*, 8*d* diametrically opposed shear forces
9*a* first connecting area
9*b* second connecting area
10 bonding area
10*a*, 10*b*, 10*c*, 10*d* sub-bondings
11 connecting areas interspace
12 intermeshing pattern
13 bonding area length direction
14*a*, 14*b* component edges
15*a*, 15*b* edge shapes
16*a* triangle wave
17*a* trapezoidal wave
18*a* sine wave
19*a* square wave
20*a* zigzag line 21 connecting plate
30 shear stress diagram
31 stresses
32 overlap length
33 shear stress curves
34 crack
35 crack growth direction
W1 connecting areas interspace width
W2 intermeshing pattern width
W3 connecting plate width

What is claimed is:

1. A structurally bonded arrangement comprising:
an interconnecting component;
a first component with a first connecting area that is structurally bonded to the interconnecting component in an associated bonding area for rigidly connecting the first component to the interconnecting component; and
a second component with a second connecting area that is structurally bonded to the interconnecting component in the associated bonding area;
wherein the first connecting area and the second connecting area form an intermeshing pattern on the interconnecting component that separates the associated bonding area in its length direction into a first plurality of separated sub-bondings and a second plurality of separated sub-bondings, wherein the first plurality of separated sub-bondings is formed in the associated bonding area between the second component and the interconnecting component; and
wherein the second plurality of separated sub-bondings is formed in the associated bonding area between the first component and the interconnecting component; and
wherein the first plurality includes at least two sub-bondings that are successive within the first plurality along the length direction, and a bonded overlap between the second connecting area and the interconnecting component is interrupted across its transverse extent in an intervening region between the at least two sub-bondings; and
wherein the second plurality includes at least two sub-bondings that are successive within the second plurality along the length direction, and a bonded overlap between the first connecting area and the interconnecting component is interrupted across its transverse extent in an intervening region between the at least two sub-bondings.

2. The structurally bonded arrangement of claim 1, wherein the first connecting area and the second connecting area are structurally bonded to a same side of the interconnecting component.

3. The structurally bonded arrangement of claim 1, wherein the first connecting area and the second connecting area are spaced apart from each other on the interconnecting component to form an interspace.

4. The structurally bonded arrangement of claim 1, wherein the first connecting area and the second connecting area are alternatingly connected to the interconnecting component in a length direction of the associated bonding area to form the first plurality of separated sub-bondings and the second plurality of separated sub-bondings.

5. The structurally bonded arrangement of claim 1, wherein the first connecting area comprises a first edge with a first shape, and wherein the second connecting area comprises a second edge with a second shape that fits to the first shape to form the intermeshing pattern.

6. The structurally bonded arrangement of claim 5, wherein the first shape and the second shape form one of a triangle wave, a trapezoidal wave, a sine wave, a square wave, a zigzag line, a sawtooth line, a chain of half-circles, or an arbitrary combination thereof.

7. The structurally bonded arrangement of claim 1, wherein the first component and the second component are panels or shells of a rotorcraft.

8. The structurally bonded arrangement of claim 7, wherein the interconnecting component is one of a joggled panel, a shell, a stringer, a rib, a frame or a beam of the rotorcraft.

9. The structurally bonded arrangement of claim 1, wherein the interconnecting component comprises a connecting plate that connects the first component and the second component to each other in a lap shear manner.

10. The structurally bonded arrangement of claim 9, wherein a width of the connecting plate is at least approximately equal to a width of the intermeshing pattern.

11. The structurally bonded arrangement of claim 1, wherein the first plurality of separated sub-bondings and the second plurality of separated sub-bondings are embodied to prevent crack growth between adjacent sub-bondings in the associated bonding area.

12. The structurally bonded arrangement of claim 1, wherein the first component and the second component are interconnected in a form-fit-free manner via the interconnecting component.

13. A rotorcraft with a structurally bonded arrangement according to claim 1.

14. The structurally bonded arrangement of claim 7, wherein the panels or shells of a rotorcraft comprise a fiber-reinforced polymer.

15. A structurally bonded arrangement comprising:
an interconnecting component comprising a connecting plate having opposite first and second lateral edges extending in a length direction;
a first component with a first connecting area structurally bonded to the connecting plate in an associated bonding area to rigidly connect the first component to the connecting plate, the associated bonding area extending across the connecting plate between the first and second lateral edges; and
a second component with a second connecting area structurally bonded to the connecting plate in the associated bonding area;
wherein the first connecting area comprises a first edge and the second connecting area comprises a second edge, the first edge and the second edge together forming an intermeshing pattern on the connecting plate, the intermeshing pattern alternately reaching the first and second lateral edges at locations along the length direction, thereby dividing a bonded overlap of the second connecting area with the connecting plate into a first plurality of separated sub-bondings and dividing a bonded overlap of the first connecting area with the connecting plate into a second plurality of separated sub-bondings, the first plurality of separated sub-bondings formed in the associated bonding area between the second component and the connecting plate; and
the second plurality of separated sub-bondings formed in the associated bonding area between the first component and the connecting plate.

16. The structurally bonded arrangement of claim 15, wherein the first connecting area and the second connecting area are structurally bonded to a same side of the connecting plate.

17. The structurally bonded arrangement of claim 15, wherein the first connecting area and the second connecting area are spaced apart from each other on the connecting plate to form an interspace.

18. The structurally bonded arrangement of claim 15, wherein the first edge has a first shape and the second edge has a second shape that fits to the first shape to form the intermeshing pattern.

19. The structurally bonded arrangement of claim 18, wherein the first shape and the second shape form one of a triangle wave, a trapezoidal wave, a sine wave, a square wave, a zigzag line, a sawtooth line, a chain of half-circles, or an arbitrary combination thereof.

20. The structurally bonded arrangement of claim 15, wherein the first component and the second component are panels or shells of a rotorcraft, and wherein the interconnecting component is one of a joggled panel, a shell, a stringer, a rib, a frame or a beam of the rotorcraft.

* * * * *